United States Patent [19]

Yamashita

[11] Patent Number: 5,018,036

[45] Date of Patent: May 21, 1991

[54] ROTARY HEAD TYPE MAGNETIC RECORDING AND REPRODUCING APPARATUS WITH DEDICATED RECORDING AND REPRODUCING MAGNETIC HEADS

[75] Inventor: Tatsumaro Yamashita, Shibata, Japan

[73] Assignee: Alps Electric Co., Ltd., Tokyo, Japan

[21] Appl. No.: 431,513

[22] Filed: Nov. 3, 1989

[30] Foreign Application Priority Data

Dec. 17, 1988 [JP] Japan ................... 63-319248

[51] Int. Cl.[5] ............................................. G11B 5/52
[52] U.S. Cl. ..................... 360/107; 360/64; 360/84
[58] Field of Search .............. 360/107, 108, 64, 84, 360/85, 121

[56] References Cited

U.S. PATENT DOCUMENTS

| | | | |
|---|---|---|---|
| 4,306,261 | 12/1981 | Bergmans | 360/84 X |
| 4,539,615 | 9/1985 | Arai et al. | 360/121 |
| 4,642,711 | 2/1987 | Yunoki et al. | 360/84 |
| 4,669,002 | 5/1987 | Nishioka et al. | 360/84 X |
| 4,758,903 | 7/1988 | Noguchi et al. | 360/19.1 |
| 4,922,359 | 5/1990 | Nakamura | 360/107 |
| 4,931,883 | 6/1990 | Baumeister et al. | 360/64 X |

*Primary Examiner*—John H. Wolff
*Attorney, Agent, or Firm*—Guy W. Shoup; David W. Heid

[57] ABSTRACT

The present invention discloses a rotary head type magnetic recording and reproducing device in which a rotary drum is provided with a pair of magnetic heads arranged at an angle of 180° and a further pair of magnetic heads deviated in phase angle from the first mentioned magnetic heads and arranged at an angle of 180° from each other, and a widening angle of a tape in contact with the drum is smaller than the phase angle, one pair of magnetic heads being exclusive for recording while the other pair of magnetic heads being exclusive for reproducing. A gap length of the magnetic head exclusive for reproducing is longer than that of the magnetic head for recording.

4 Claims, 6 Drawing Sheets

ROTARY HEAD TYPE MAGNETIC RECORDING AND REPRODUCING APPARATUS WITH DEDICATED RECORDING AND REPRODUCING MAGNETIC HEADS

BACKGROUND OF THE INVENTION

1. Field of the Invention

The present invention relates to a 4-head system rotary head type magnetic recording and reproducing apparatus in which PCM data sent from a computer is recorded.

2. Prior Art

FIG. 8 is a block diagram showing a conventional rotary head type magnetic recording and reproducing apparatus for DAT for recording and reproducing a digital audio signal.

This prior art is of a two-head system, in which a pair of magnetic heads $H_1$ and $H_2$ are arranged on a rotary drum 1 at an angle of 180°. The pair of magnetic heads $H_1$ and $H_2$ are both used for recording and reproducing. In DAT, an open angle of contact length with respect to the rotary drum 1 of a magnetic tape T is 90 degrees, the tape T running in a direction as indicated at arrow. The rotary drum 1 rotates counterclockwise in the figure, and the pair of magnetic heads $H_1$ and $H_2$ alternately scan with respect to the magnetic tape T.

Since the magnetic heads $H_1$ and $H_2$ are for recording and reproducing, they are connected to a recording head amplifier 2 and a reproducing head amplifier 3 through a signal transmission means (not shown) such as a rotary transformer. A recording signal processing circuit 4 and a reproducing signal processing circuit 5 are connected to the recording head amplifier 2 and the reproducing head amplifier 3, respectively. A digital audio signal is fed to the recording signal processing circuit 4, and a format including a signal for ATF (Automatic Track Following) or a subcode signal is formed by the recording signal processing circuit 4 and is amplified by the recording head amplifier 2 and recorded on a recording surface of the magnetic tape t by the magnetic heads $H_1$ and $H_2$. In the reproducing operation, the magnetic heads $H_1$ and $H_2$ scan the magnetic tape T and a signal being recorded is then read and amplified by the reproducing head amplifier 3 and processed by the reproducing signal processing circuit 5. A digital signal output from the reproducing signal processing circuit 5 is demodulated, detected and amplified.

In the conventional rotary type magnetic recording and reproducing apparatus for DAT, the magnetic heads $H_1$ and $H_2$ are for recording and reproducing, and therefore, the gap length is also designed for use with the recording and reproducing, as shown in FIG. 8. FIG. 9 shows a magnetic head gap during the recording operation, and FIG. 10 shows a magnetic head gap during the reproducing operation. As shown in these figures, in both the magnetic heads $H_1$ and $H_2$, the length T in a direction perpendicularly intersecting with the scanning direction of the gap G is longer than a track pitch (shown at P in FIG. 9). According to a standard of DAT, a track pitch p is 13.6 μm but the length T is in the order of 21 μm. FIGS. 9 and 10 show one magnetic head $H_1$ but the other magnetic head $H_2$ has the same gap dimension as that of the magnetic head $H_1$ and has an azimuth angle reversed to $H_1$.

The gap length of the magnetic heads $H_1$ and $H_2$ is longer than the track pitch p as described above. One reason therefor is that ATF is caused to operate during the reproducing operation. An ATF signal is recorded in areas in both ends of each track recorded on the magnetic tape but during the reproducing, the magnetic heads $H_1$ and $H_2$ read ATF signals (pilot signals) of tracks (1 and 2 in FIG. 10) adjacent on both sides of a track (indicated at 2 in FIG. 10) being reproduced, as shown in FIG. 10. By detecting the pilot signals adjacent on both sides as described above, a tracking error direction is detected and a capstan servo is applied accordingly.

The gap length T of the magnetic head is longer than the track pitch p as described above, and therefore, in the recording operation, when data are recorded on the magnetic tape T in order of tracks 1, 2, 3 . . . , an overwrite portion (indicated by hatching in FIG. 9) is formed between the adjacent tracks. There can be obtained the merit in that high density recording free from a clearance between the tracks becomes possible by forming the overwrite portion as described. But there also gives, rise to an inconvenience caused by the overwrite. That is, when an overwrite portion is formed as shown in FIG. 9, a residual magnetism in the overwrite portion cannot be completely removed, and therefore, the S/N ratio of a reproducing signal is lowered by the residual signal in the overwrite portion. FIG. 7 shows a deterioration of signals due to the overwrite. The axis of abscissa indicates the linear recording density, and the axis of coordinates indicates the symbol error rate when an 8-10 modulated signal is reproduced. As shown, as the linear recording density increases, the error rate increases but if an overwrite portion is present, the error rate increases as compared with the case where the overwrite is not present. In the reproducing apparatus for overwrite, demodulation is affected because of the deterioration in signal of the overwrite portion. At the same time, the detection of ATF is adversely affected by the overwrite portion. In the reproducing operation, when an ATF pilot signal of a track to which magnetic head is adjacent is detected, the overwrite portion is also read, and therefore, a residual magnetism results in a turbulence, lowering the tracking accuracy.

In regards to the reproducing operation alone, if the length T of the head gap G increases in order to stabilize the ATF servo, the pilot signal of the adjacent track can be read in a stable manner. However, if the length T unconditionally increases, the width of the overwrite portion shown in FIG. 9 becomes excessively widened during the recording operation. In view of the foregoing, in the conventional apparatus, the gap length is set to be about 1.5 times with respect to the track pitch p. However, the head gap for scanning the adjacent track is thus limited so that, if an undulation occured in the track during recording, the head gap can sometimes miss the ATF area during reproduction.

SUMMARY OF THE INVENTION

The present invention overcomes the problems encountered in prior art. It is an object of the present invention to provide a rotary head type magnetic recording and reproducing device which is designed not to produce an overwrite portion in a track being recorded in order to prevent a reproduced signal from being deteriorated and in which ATF detection is effected in a stable manner during reproducing operation.

For achieving the aforesaid object, according to the present invention, there is provided a rotary head type magnetic recording and reproducing device in which a drum rotatively driven is provided with a pair of magnetic heads arranged at an angle of 180° and a pair of magnetic heads deviated in phase angle in a rotating direction from the first mentioned magnetic heads and arranged at an angle of 180° from each other, and a widening angle of a magnetic tape in contact with the drum from the center of the drum is less than said phase angle, characterized in that said one pair of magnetic heads are exclusive for recording and the other pair of magnetic heads are exclusive for reproducing.

In the aforementioned device, the pair of magnetic heads exclusive for reproducing have a gap length in a direction perpendicularly intersecting with a scanning direction thereof, said gap length being longer than that of the magnetic heads exclusive for recording.

In the above-described means, a conventional recording and reproducing magnetic head is not used but a rotary head device having four heads mounted thereon is used so that one pair of magnetic heads are exclusively used for recording and the other pair of magnetic heads are exclusively used for reproducing. The recording operation is carried out by the magnetic heads exclusive for recording, and in the case where an operation of read-after-write for error monitor is carried out, the recorded data is immediately read by the magnetic heads exclusive for reproducing. The reproducing operation is carried out by the magnetic heads exclusive for reproducing.

The rotary head type magnetic recording and reproducing device is suitable for recording PCM data fed from a computer to back-up a hard disc. In case where in DAT, an audio signal is recorded, an end of data already recorded in case of overlapping writing or the like is searched to join data continuous from the end. To this end, a recording and reproducing magnetic head may be used. However, in case of data for computer, data need not be strictly joined. For example, as shown in FIG. 11, if a recording error of data in a portion indicated at α is found when data are successively recorded, the same data can be continuously rewritten as shown at β. It is therefore not necessary to perform searching the end by the recording and reproducing magnetic head and continuous recording from the end, and full function can be performed by the magnetic head exclusive for recording. In case of the magnetic head exclusive for recording, only a recording circuit is connected to said magnetic head, simplifying the circuit structure as compared with the prior art in which a recording and reproducing magnetic head is used.

Unlike the conventional recording and reproducing magnetic head, the magnetic head exclusive for recording need not scan an adjacent track for ATF, so that the length of the magnetic head exclusive for recording can be substantially coincided with a track pitch. Thereby, an overwrite between the adjacent tracks can be eliminated to enhance the reproducing accuracy of data. The gap length of the magnetic head exclusive for reproducing can be increased up to covering the full width of an adjacent track. Thereby, in ATF, it is possible to positively read a pilot signal of an adjacent track, and tracking can be accomplished with high accuracy.

DETAILED DESCRIPTION OF THE PREFERRED EMBODIMENTS

An embodiment of the present invention will be described hereinafter with reference to FIGS. 1 to 6.

Figure 1:
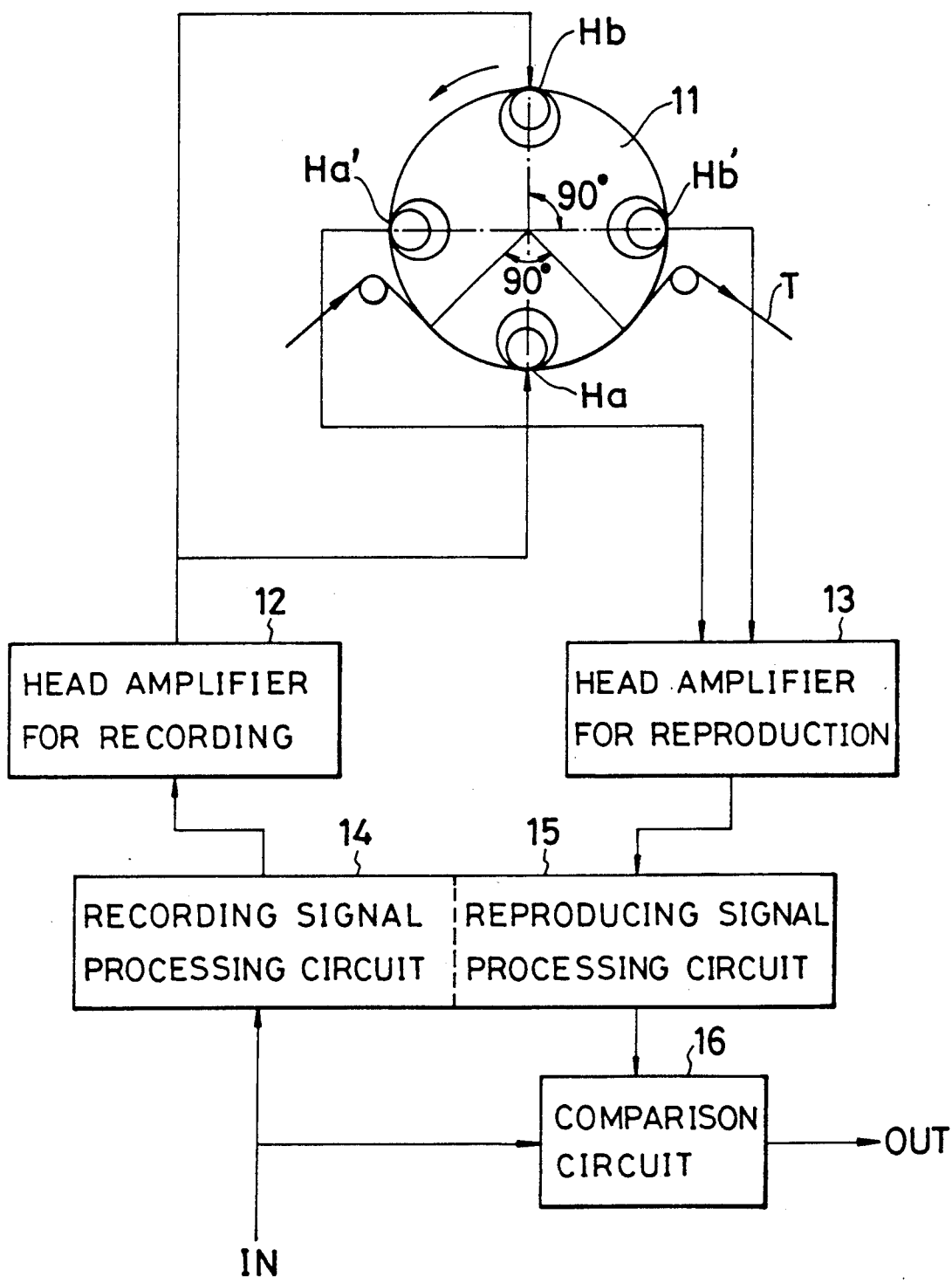
FIG. 1 is a block diagram of a circuit showing a rotary head type magnetic recording and reproducing device according to the present invention.

FIG. 1 is a block diagram of a circuit showing a rotary head type magnetic recording and reproducing device according to the present invention.

Reference numeral 11 designates a rotary drum, on which four magnetic heads Ha, Hb, Ha' and Hb' are mounted. A pair of magnetic heads Ha and Hb are exclusive for recording and provided at an angle of 180° from each other. The other pair of magnetic heads Ha' and Hb' are exclusive for reproducing. The magnetic heads Ha' and Hb' exclusive for reproducing are arranged deviated in phase angle by 90° in a rotating direction from the magnetic heads Ha and Hb exclusive for recording. In this embodiment, an open angle of a contact length of a magnetic tape T to the rotary drum 11 is 90°. The magnetic heads exclusive for recording Ha and Hb are connected to a recording head amplifier 12 through a signal transmission means such as a rotary transformer, and the magnetic head exclusive for reproducing Ha' and Hb' are connected to a reproducing head amplifier 13 through a rotary transformer or the like. Reference numeral 14 designates a recording signal processing circuit, and 15 a reproducing signal processing circuit. Reference numeral 16 designates a comparison circuit used for read-after-write, and a recording error is checked by the comparison circuit 16.

Figure 2:
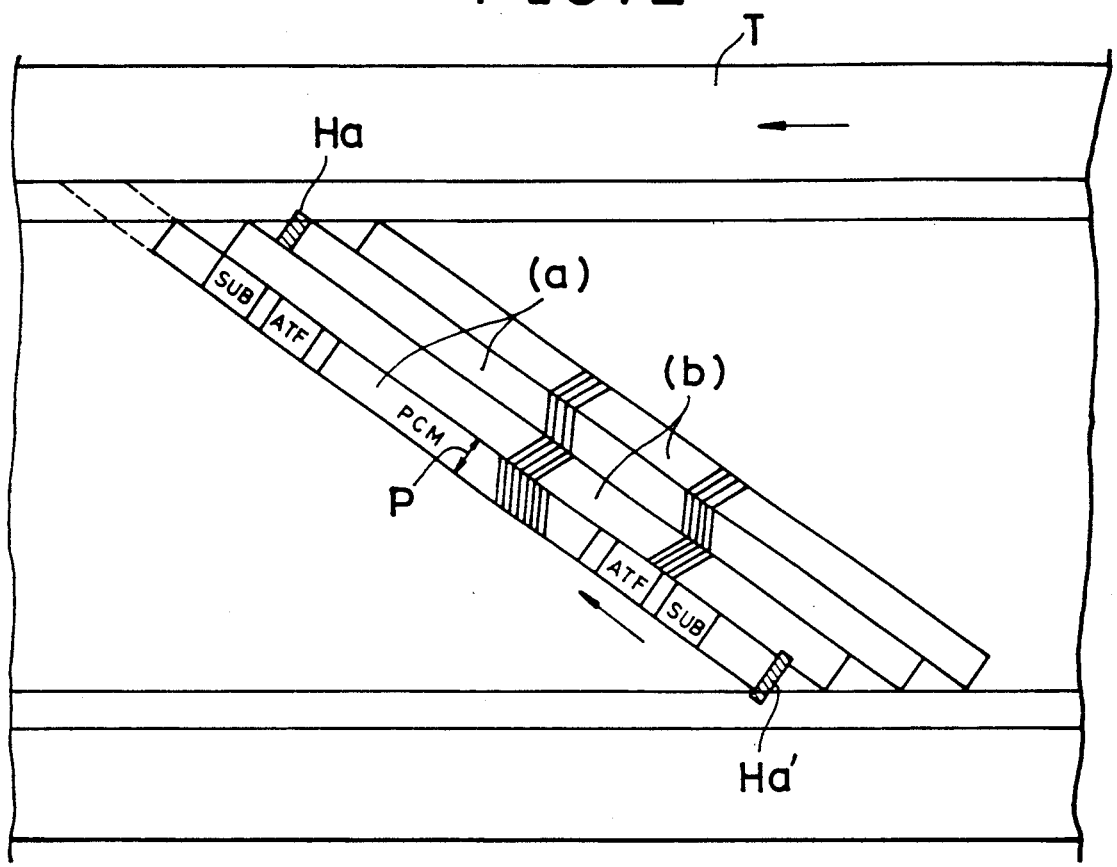
FIG. 2 is a plan view showing data being recorded on a magnetic tape from the magnetic head side.

FIG. 2 schematically shows a recording state of data to a magnetic tape and data format, showing a state of a recording surface of a magnetic tape T as viewed from the magnetic head.

In the magnetic heads exclusive for recording, an azimuth angle of Ha is reversed to that of Hb. In the magnetic heads exclusive for reproducing, Ha' has the same azimuth angle as that of Ha, and Hb' has the same azimuth angle as that of Hb. In FIG. 2, the magnetic heads Ha and Ha' scans a track indicated at (a) and the Hb and Hb' scans a track indicated at (b). A central portion of the track is an area for recording PCM. Opposite portions of the track are areas for recording ATF and SUB codes.

Figure 3:
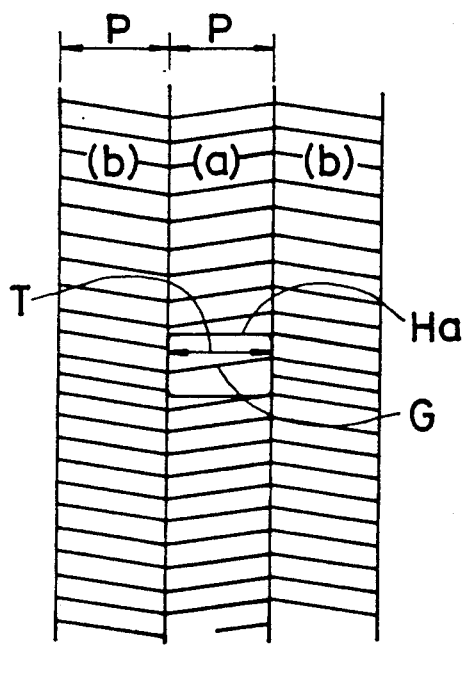
FIG. 3 is a plan view showing a state wherein a magnetic head exclusive for recording scans a track.
Figure 4:
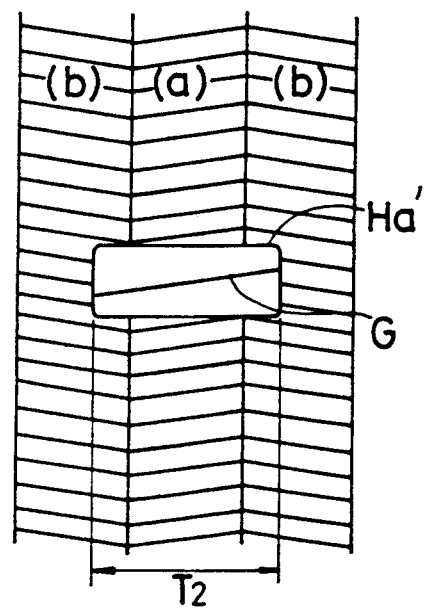
FIG. 4 is a plan view showing a state wherein a magnetic head exclusive for reproducing scans a track.
Figure 5:
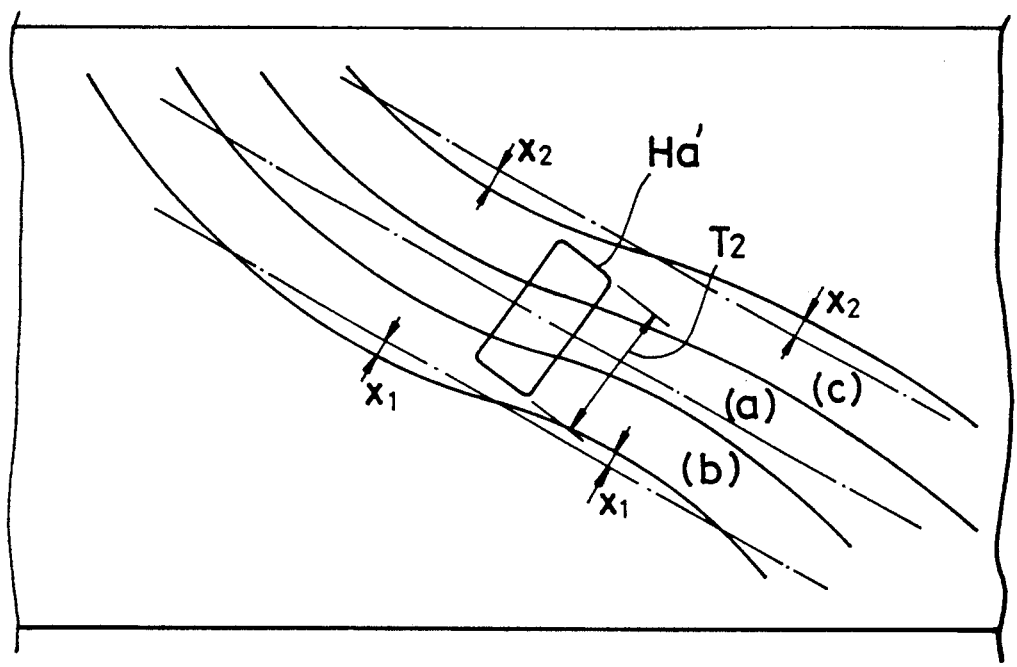
FIG. 5 shows a plan view showing a state wherein a magnetic head exclusive for reproducing scans a track involving an undulation.
Figure 6:
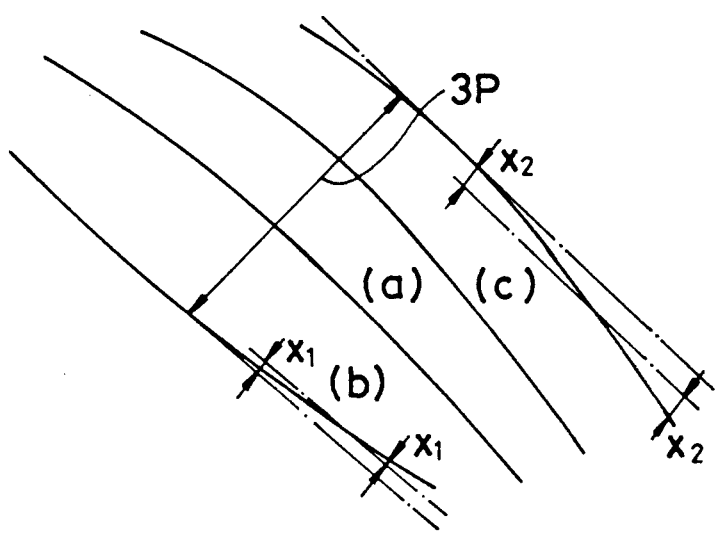
FIG. 6 is an enlarged view thereof.
Figure 7:
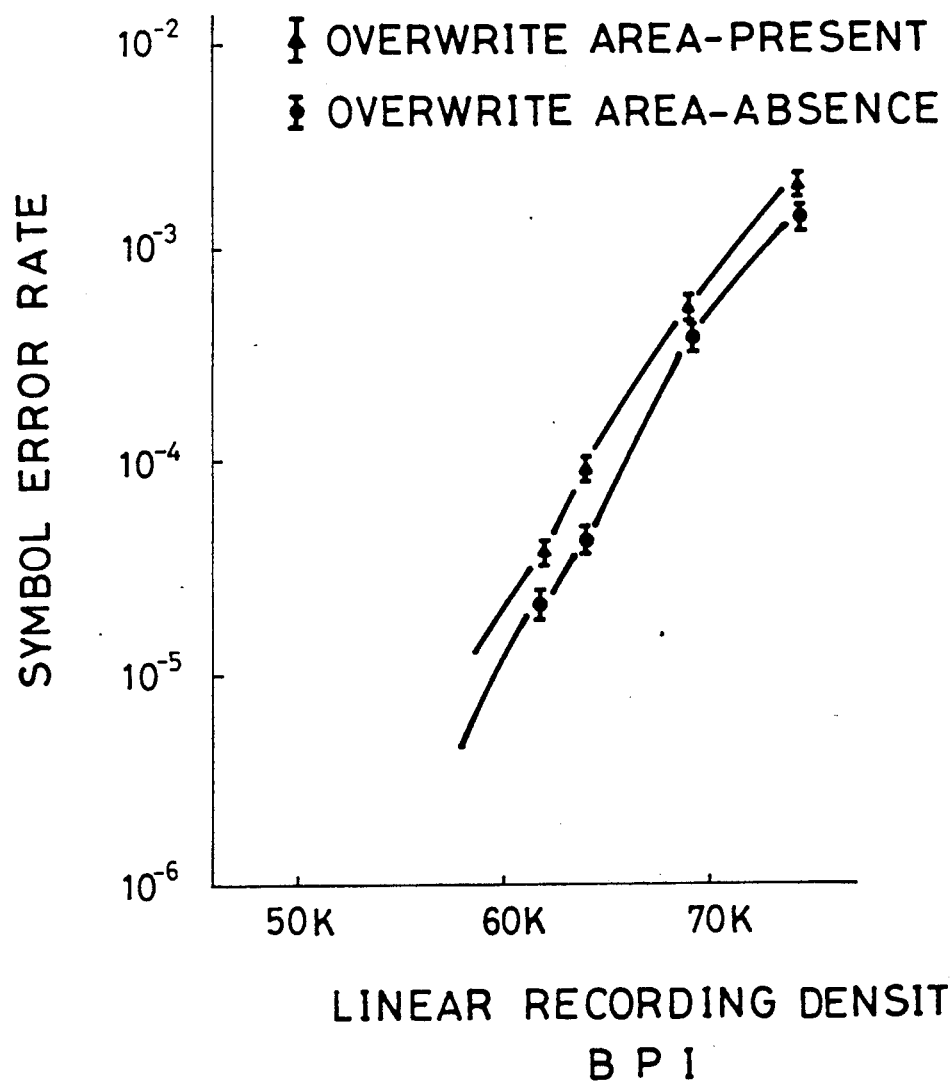
FIG. 7 is a diagram showing the influence of an overwrite.
Figure 8:
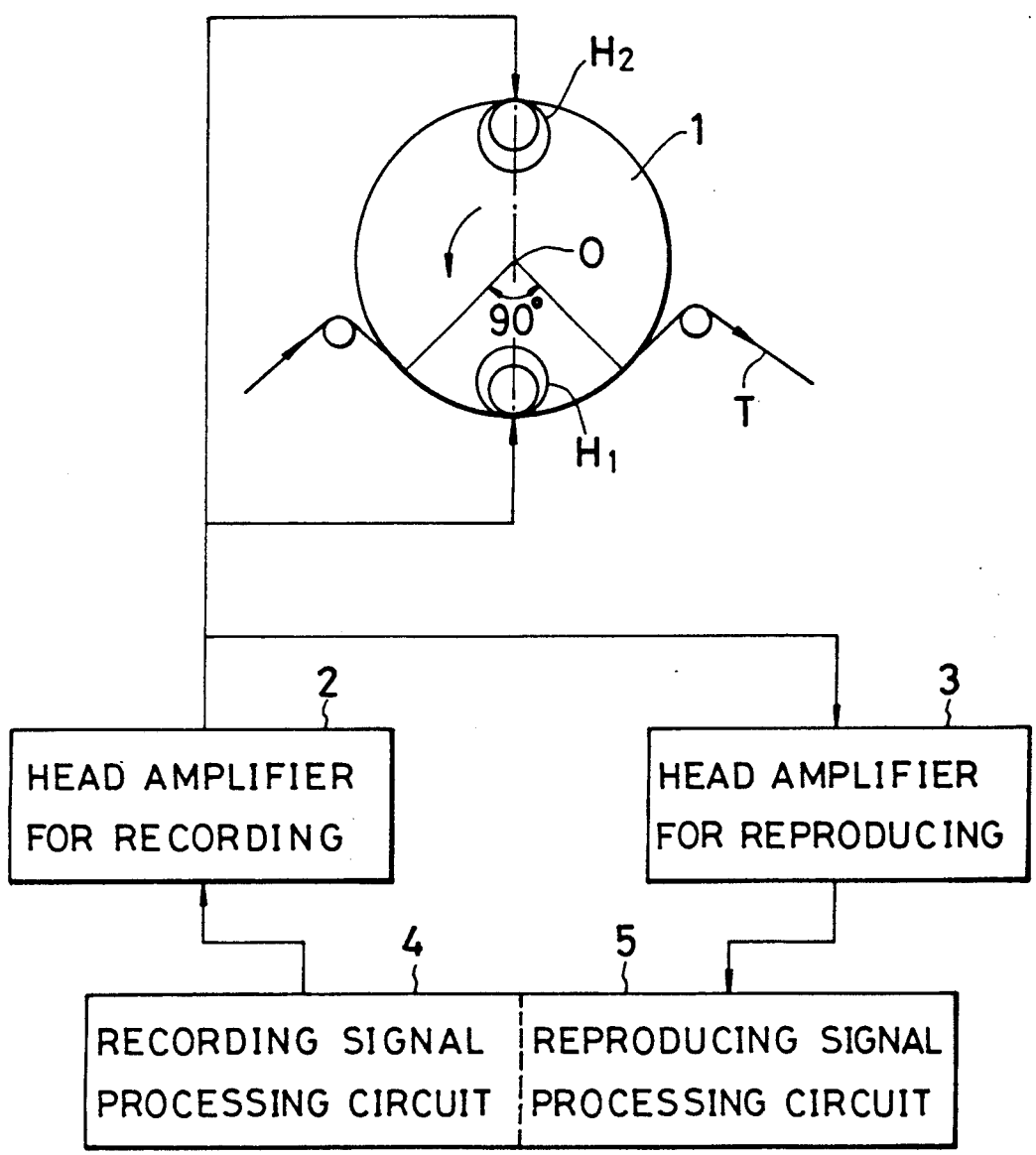
FIG. 8 is a block diagram of a circuit of a conventional rotary head type magnetic recording and reproducing device for DAT.
Figure 9:
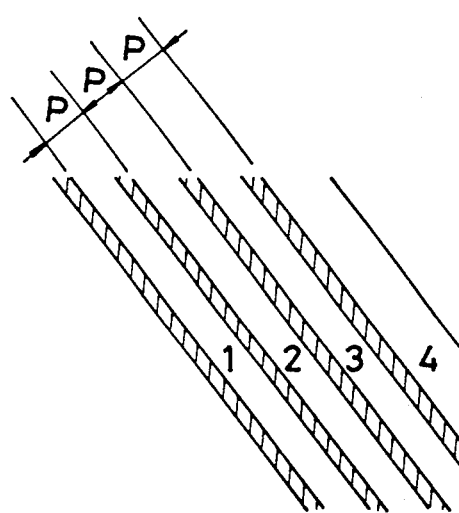
FIG. 9 is a plan view showing the recording operation of the conventional recording and reproducing magnetic head.
Figure 10:
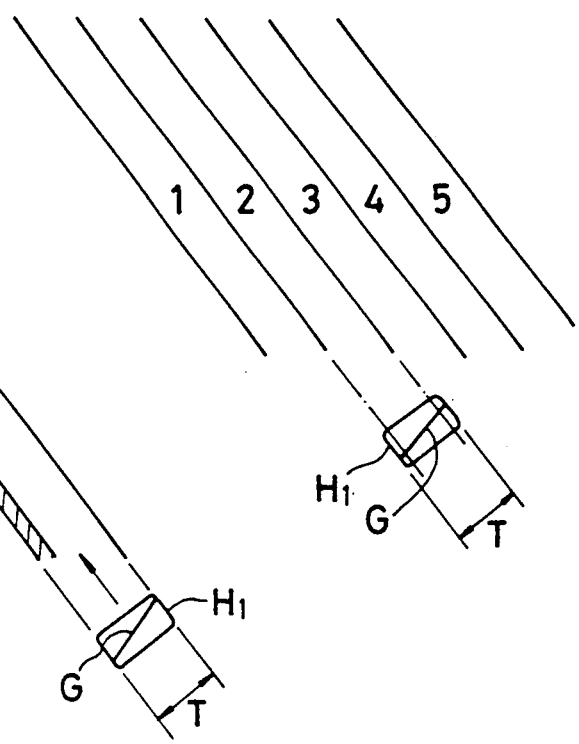
FIG. 10 is a plan view showing the reproducing operation according to the conventional recording and reproducing magnetic head.
Figure 11:
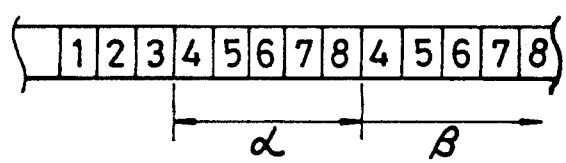
FIG. 11 is an explanatory view showing an error state when data of a computer is recorded.

FIG. 3 shows a state wherein the magnetic head Ha exclusive for recording scans the track (a), and FIG. 4 shows a state wherein the magnetic head Ha' exclusive for reproducing scans the track (a). Both the magnetic heads are the same in direction of the azimuth angle of the head gap G but are different in length. The gap length T₁ of the magnetic head Ha exclusive for recording is substantially coincided with the track pitch p. In case of a DAT standard, T₁ is approximately 13.6 μm. The gap length T₂ of the magnetic head Ha' exclusive for reproducing is longer than the gap length T₁ of the magnetic head Ha exclusive for recording. The magnetic head Ha' exclusive for reproducing scans the tracks (b) adjacent to left and right together, whereby a pilot signal of ATF of the left and right tracks can be detected. However, the magnetic head Ha' exclusive for reproducing does not perform the recording operation, and therefore, the gap length T₂ can be fully increased to cover the full width of an adjacent track. The upper limit $T_{2MAX}$ of the gap length T₂ of the magnetic head Ha' exclusive for reproducing is given by $$T_{2MAX} = 3p - 4x \quad (1)$$

wherein p represents a track pitch, and x a maximum value of a linearity of a track. This linearity is an amount of undulation of the track. As shown in FIG. 5, there is a possibility of occuring an undulation in a track to be recorded on a tape. In order to express the undulation, deflections in direction of plus and minus with respect to the original track direction are represented by $x_1$ and $x_2$, said x being the maximum value. As shown in FIG. 6, it is assumed that the track is undulated from both edges (spacing of 3p) of three tracks inwardly, there sometimes occurs the case where a dimension of a portion at which the spacing between both the edges of three tracks is the minimum value is (3p−4x). Thereby, the condition that the magnetic head Ha' exclusive for reproducing does not scan the track further adjacent to the adjacent track is that the maximum of the gap length fulfills the aforesaid formula (1).

It is noted that the dimensions of the magnetic head Hb exclusive for recording and the magnetic head Hb' exclusive for reproducing are the same as those of the head Ha and the head Ha', except that the direction of the azimuth angle is reversed.

The operation of the rotary head type magnetic recording and reproducing device shown in FIG. 1 will be described hereinafter.

In the recording operation, PCM data fed from the computer is processed by the recording signal processing circuit 14 to form a format, which is amplified by the recording head amplifier 12 and recorded on the magnetic tape T by the magnetic heads Ha and Hb exclusive for recording. In the magnetic heads Ha and Hb exclusive for recording, the gap length T₁ is substantially coincided with the track pitch p, and therefore, as shown in FIG. 3, the overwrite portion will no longer present between the adjacent tracks. Thereby, the deterioration of the reproduced data caused by the residual magnetism will not occur.

The recorded data is delayed by one frame (two tracks) as shown in FIG. 2 and read by the magnetic heads Ha' and Hb' exclusive for reproducing. This read signal is amplified by the reproducing head amplifier 13 shown in FIG. 1 and processed by the reproducing signal processing circuit 15. The signal is then compared with a recording signal by the comparator 16 to check an error of the recording signal.

Next, in the reproducing operation, the magnetic heads Ha' and Hb' exclusive for reproducing scan tracks to read a recording signal. The signal is amplified by the reproducing head amplifier 13, processed by the reproducing signal processing circuit 15 and stored with the processed PCM data in a buffer memory or the like, after which it is fed to the computer. As shown in FIG. 4, the gap G of the magnetic heads Ha' and Hb' exclusive for reproducing scans adjacent tracks but the direction of the azimuth angle of the recording signal is different, and therefore, a cross talk level of the PCM data or the like is very small. However, the pilot signal in the area of recording ATF is recorded by frequency which can detect even the reverse azimuth. Thereby, the pilot signal is detected by a portion of the head gap G forced out toward the adjacent track. A capstan is supported by the detection of signal and tracking takes place.

It is noted that in the magnetic head exclusive for recording, the gap length T₁ is not necessarily coincided positively with the track pitch p but is made to be slightly larger than the track pitch so as to make the overwrite portion with the adjacent track small to an extent such that reproducing is not affected.

As described above, in the present invention, a pair of magnetic heads exclusive for recording and a pair of magnetic heads exclusive for reproducing are provided on a rotary drum. The circuit structure can be simplified by the separate provision of the recording and reproducing magnetic heads as just mentioned. Particularly, only the circuit of the recording system need be connected to the magnetic heads exclusive for recording, and therefore, the circuit connection can be also simplified.

Furthermore, the gap length of the magnetic head exclusive for reproducing is set to be longer than that of the magnetic head exclusive for recording, and therefore, in the recording operation, the overwrite area of the adjacent track can be eliminated or an area thereof can be minimized. Moreover, in the reproducing operation, the ATF pilot signal of the adjacent track can be positively read by the magnetic head exclusive for reproducing, and the tracking accuracy is enhanced. In addition, even if an undulation of the tracks occurs as shown in FIG. 5, the track can be positively scanned by the magnetic head exclusive for reproducing.

What is claimed is:

1. A rotary head type magnetic recording and reproducing device in which a drum rotatively driven comprises:

a first pair of magnetic heads exclusively for recording arranged at angle of 180°;

a second pair of magnetic heads exclusively for reproducing deviated by a phase angle in a rotating direction from the first pair of magnetic heads, each magnetic head in said second pair of magnetic heads arranged at an angle of 180° from each other, and such that the angle by which a magnetic tape in contact with the drum substends at the center of the drum is less than or equal to the smallest phase angle between said first and second pairs of magnetic heads.

2. The rotary head type magnetic recording and reproducing device according to claim 1, wherein each of said second pair of magnetic heads has a gap length in a direction perpendicularly intersecting the scanning direction thereof longer than the gap length in each of said first pair of magnetic heads.

3. A rotary head type magnetic recording and reproducing device as in claim 2, wherein the gap length in each of said first pair of magnetic heads is substantially p and the gap length in each of said second pair of magnetic heads is between p and 3p−4x, where p is the width of a recording track on said magnetic tape and x is the maximum undulation of said recording track.

4. A rotary head type magnetic recording and reproducing device as in claim 1, further comprising means for comparing the record written by said first pair of magnetic heads with the record read by said second pair of magnetic heads in a read-after-write operation.

* * * * *